US005467128A

United States Patent [19]
Yates et al.

[11] Patent Number: 5,467,128
[45] Date of Patent: Nov. 14, 1995

[54] HIGH SPEED IMAGER TEST STATION

[75] Inventors: George J. Yates, Santa Fe; Kevin L. Albright, Los Alamos, both of N.M.; Bojan T. Turko, Moraga, Calif.

[73] Assignee: The Regents of the University of California, Office of Technology Transfer, Alameda, Calif.

[21] Appl. No.: 183,544

[22] Filed: Jan. 19, 1994

[51] Int. Cl.$^6$ .......................... H04N 17/00; H04N 17/02
[52] U.S. Cl. .......................... 348/187; 348/188; 364/579
[58] Field of Search .......................... 348/187, 188, 348/180, 189, 184, 185; 364/579, 525; H04N 17/00, 17/02

[56] References Cited

U.S. PATENT DOCUMENTS

| 5,033,015 | 7/1991 | Zwin | 348/187 |
| 5,293,543 | 3/1994 | Okabe | 348/187 |

FOREIGN PATENT DOCUMENTS

| 0160895 | 7/1987 | Japan | H04N 17/00 |

OTHER PUBLICATIONS

George J. Yates et al., "High-Speed Test Station For Solid-State Imagers," Los Alamos National Laboratory LA-UR-92-2352, NTIS (Oct. 1992).

Primary Examiner—James J. Groody
Assistant Examiner—Michael H. Lee
Attorney, Agent, or Firm—Ray G. Wilson

[57] ABSTRACT

A test station enables the performance of a solid state imager (herein called a focal plane array or FPA) to be determined at high image frame rates. A programmable waveform generator is adapted to generate clock pulses at determinable rates for clock light-induced charges from a FPA. The FPA is mounted on an imager header board for placing the imager in operable proximity to level shifters for receiving the clock pulses and outputting pulses effective to clock charge from the pixels forming the FPA. Each of the clock level shifters is driven by leading and trailing edge portions of the clock pulses to reduce power dissipation in the FPA. Analog circuits receive output charge pulses clocked from the FPA pixels. The analog circuits condition the charge pulses to cancel noise in the pulses and to determine and hold a peak value of the charge for digitizing. A high speed digitizer receives the peak signal value and outputs a digital representation of each one of the charge pulses. A video system then displays an image associated with the digital representation of the output charge pulses clocked from the FPA. In one embodiment, the FPA image is formatted to a standard video format for display on conventional video equipment.

6 Claims, 12 Drawing Sheets

| SEQ | LABEL | INSTRUCTION | Pg 5_1 Dec | 7 | 6 | 5 | 4 | 3 | 2 | 1 | 0 |
|---|---|---|---|---|---|---|---|---|---|---|---|
| 0 | FRMSYN | Repeat | 25 | 1 | 1 | 1 | 0 | 0 | 0 | 1 | 0 |
| 1 |  | Load A | 260 | 0 | 0 | 1 | 0 | 0 | 0 | 1 | 0 |
| 2 | PCLOCK | Repeat | 10 | 0 | 1 | 1 | 0 | 0 | 0 | 1 | 0 |
| 3 |  | Repeat | 10 | 0 | 1 | 1 | 0 | 0 | 0 | 1 | 0 |
| 4 |  | Repeat | 10 | 0 | 1 | 1 | 0 | 0 | 0 | 1 | 1 |
| 5 |  | Repeat | 10 | 0 | 1 | 1 | 0 | 0 | 1 | 0 | 1 |
| 6 |  | Repeat | 10 | 0 | 1 | 1 | 0 | 0 | 1 | 0 | 1 |
| 7 |  | Repeat | 10 | 0 | 1 | 1 | 0 | 0 | 1 | 1 | 0 |
| 8 |  | Load B | 138 | 0 | 0 | 0 | 0 | 0 | 0 | 1 | 0 |
| 9 | SCLOCK | Decr B |  | 0 | 1 | 1 | 1 | 0 | 0 | 1 | 0 |
| 10 |  | If B≠0 Jump SCLOCK |  | 0 | 0 | 1 | 0 | 0 | 0 | 1 | 0 |
| 11 |  | Decr A |  | 0 | 0 | 1 | 0 | 0 | 0 | 1 | 0 |
| 12 |  | If A≠0 Jump PCLOCK |  | 0 | 0 | 1 | 0 | 0 | 0 | 1 | 0 |
| 13 |  | Jump FRMSYN |  | 0 | 0 | 1 | 0 | 0 | 0 | 1 | 0 |
| 14 | END | Halt |  | 0 | 0 | 1 | 0 | 0 | 0 | 1 | 0 |
|  |  |  |  | F | R | S3 | S2 | S1 | P3 | P2 | P1 |

HIGH SPEED IMAGER TEST STATION

BACKGROUND OF THE INVENTION

This invention relates to solid state imagers and, more particularly, to high speed testing of solid state imagers. This invention was made with government support under Contract No. W-7405-ENG-36 awarded by the U.S. Department of Energy. The government has certain rights in the invention.

Conventional solid state imagers, also known as focal plane arrays (FPA), include charge-coupled devices (CCD) and charge-injection devices (CID). A CCD consists on an array, or frame, of light-sensitive elements geometrically arranged in rows on a rectangular piece of silicon. These elements, or pixels, can range in number from several tens of thousands to a few million per frame. The larger the number of pixels per frame, the higher the resolution of the resulting image.

Various levels of electric charge build up in each pixel, depending on the time integral of the intensity of the light that strikes the pixel. The levels of charge in each pixel form a pattern of the final image. Lighter areas on the final image correspond to a greater amount of stored charge than do darker areas. The final image is read out by a sequence of electrical pulses applied to the CCD. The charge stored in each pixel is systematically transported through the CCD and then read out and recorded as discrete electrical signals. The discrete signals are then recombined to form the final image.

There are many instances where high speed imaging, i.e., a high frame rate, is desirable. For example, images from a region adjacent a nuclear explosion require a high image transfer capability to telemeter information prior to destruction by the shock wave. Medical diagnostics could use real time imaging of motion using x-rays of bone and muscle movements. Such applications might use frame rates of a thousand or more frames per second. To obtain a high frame rate, it is apparent that light-induced charge on the pixels that comprise each frame must be capable of being clocked from the imager at a very high rate.

However, high speed operation of solid-state imagers causes a number of undesired effects. For example, charge transfer efficiency is adversely affected by high-clocking rates, due primarily to distributed resistive and capacitive (RC) time constants of the polysilicon clocking lines causing dispersion and attenuation of the voltage waveforms that transfer the photocharge from each pixel to a readout port. A high bandwidth amplifier is needed for a high pixel output rate, but this increases the noise floor of the system to limit the minimum detectable signal. These effects combine to reduce the modulation transfer function (MTF) capabilities of the imager. Secondary effects include heating from high-frequency clocking of resistive elements and oscillations from poor layout of device and bond wires.

There is a need to investigate these effects for development of solid state focal plane arrays. There is also a need to characterize imager operation over a range of operating frame rates. Accordingly, the present invention is directed to a high speed imager test station for clocking solid state image devices at high output rates, e.g., up to 100 MHz.

One object of the present invention is to provide a test station that can achieve a range of high speed frame rates for solid state imagers.

Yet another object of the present invention is provide an imager header board to provide clock waveforms effective for high speed charge transport through an imager, to provide differential amplifiers for background subtraction, and to provide properly phased clock wave forms for strobing high speed track and hold amplifiers.

One other object of the present invention is to provide for reconstructing the imager output to a video image for evaluation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a test station for determining the performance of a solid state imager. A programmable waveform generator outputs clock pulses at a variable rate. An imager header board provides for mounting the solid state imager to be tested and includes clock level shifters for receiving the clock pulses and outputting high voltage level pulses effective to clock light-induced charge from pixels that form the solid state imager. Each one of the clock level shifters includes means for differentiating the output clock pulses so that the solid state imager is driven by leading and trailing edges of the clock pulses to reduce power dissipation in the imager. An analog circuit receives the output charge clocked from the solid state imager and includes differential amplifier means to cancel noise in pulses formed by the output charge and peak sensing and holding means to sequentially hold a peak value of each one of the pulses. In a preferred embodiment, the peak value is strobed from the holding means once the peak value is reached and is output to a high speed digitizer to output a digital representation of the charge. Video means then displays an image associated with the digital representation of the charge.

In another characterization of the invention, a test method provides for testing the response of a solid state imager to input patterns. The solid imager is exposed to a test pattern to generate a pattern of light-induced charges on the imager. A sequence of clock pulses is generated at a determinable rate to clock charges from pixels on the imager. Each one of the clock pulses is differentiated to provide output signals from leading and trailing edges of the clock pulses to transfer an output pulse corresponding to an output charge from each one of the pixels. Each one of the output pulses is sampled to obtain a peak value, which is then converted to a digital signal functionally related to the quantity of the charge. The test pattern is recreated from the digital signals representing the charges on the pixels, where the recreation is at a rate different from the determinable rate.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE DRAWINGS

Figure 1:
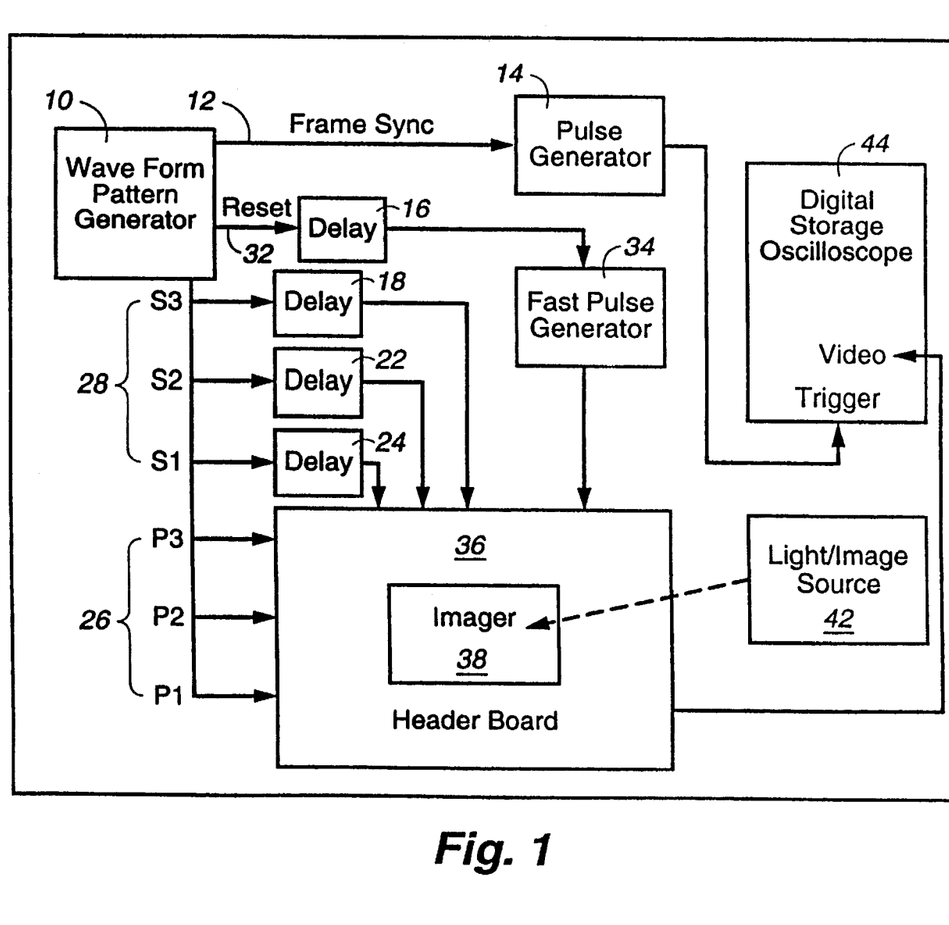
FIG. 1 is a block diagram illustrating one embodiment of the present invention.

Referring first to FIG. 1, there is shown one embodiment of an imager test station in block diagram form according to the present invention. Waveform pattern generator 10 provides a sequence of pulses with programmable timing and rate for use in clocking image information from a solid state imager (hereinafter referred to as a FPA) 38 being tested. Pulses from generator 10 are provided to form a synchronous frame pulse 12 to pulse generator 14 for use in triggering digital storage oscilloscope (DSO) 44 to capture and store an image formed by FPA 38. Output pulses also form serial or horizontal clock pulses S1, S2, and S3 that input to imager header board 36 through delay lines 18, 22, and 24, respectively; parallel or vertical clock pulses P1, P2, and P3; and reset pulse 32 that is input through delay line 166 to fast pulse generator 34 for generating a reset pulse to header board 36. FPA 38 is mounted on header board 36 for receiving an image from source 42. Pulse conditioning circuitry (FIGS. 2 and 3) is mounted on header board 36 to provide a high rate of clocking to imager board 36 with low power dissipation even at high clock rates. The conditioned pulses are input to FPA 38 and generate signals functionally related to the charge stored on individual pixels that form FPA 38 to be outputted from FPA 38. The output signals are digitized by DSO 44 for further processing and to capture and store an image.

Figure 2:
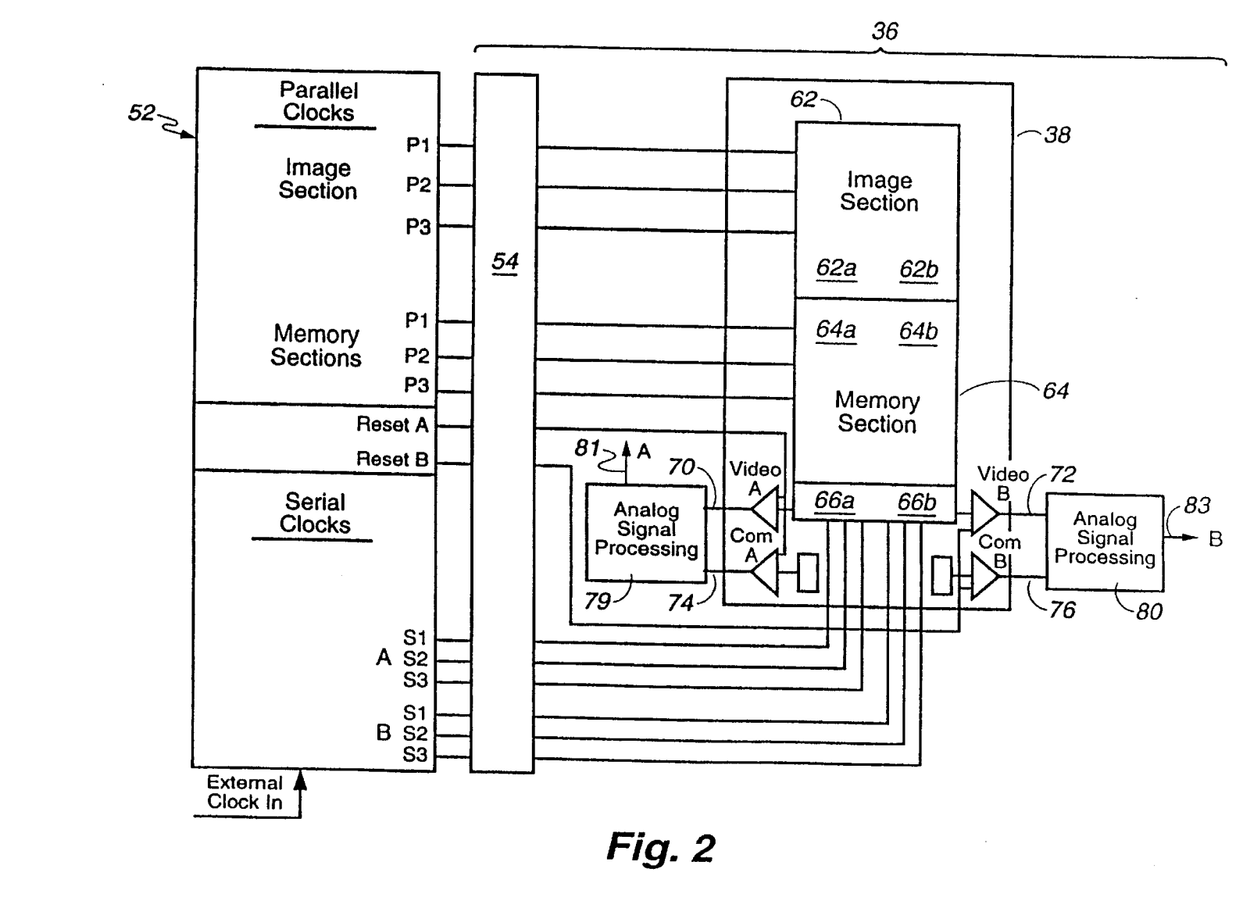
FIG. 2 is a block diagram illustrating component parts of an imager header board and waveform pattern generator.

FIG. 2 depicts imager header board 36 in a block diagram schematic. FPA 38 that is to be tested is mounted on a circuit board (not specifically shown) and electrically connected to waveform pattern generator circuits 52 through level shifters 54, more particularly shown in FIG. 3. It will be appreciated that the configuration of imager header board 36 will be a function of the imager to be tested, although each header board 36 will incorporate functional components to provide level shifters 54 for clocking charge from the pixels forming FPA 38 and analog signal processing circuits 79 and 80, for outputting the charge signals. For purposes of illustration, FPA 38 is a CCD of the frame transfer type. FPA 38 is divided into an upper active imaging area 62, with image sections 62a, 62b, and memory section 64 with memory sections 64a and 64b. Thus, four areas are formed, each containing 128 (horizontal)×256 (vertical) pixels. Imaging area 62 and memory area 64 can be clocked vertically through the array by clock pulses P1, P2, and P3. One image is clocked from memory area 64 into serial registers 66a and 66b as another image is loaded from image area 62. Serial registers 66a and 66b are clocked by serial pulses S1, S2, and S3 to either side to form Video A 70 and Video B 72 signals. FPA 38 also generates dummy signals COM A 74 and COM B 76 by capacitive coupling from the input clock signals. The dummy outputs 74 and 76 are provided to allow fixed pattern noise subtraction in off-chip differential amplifiers. Each dummy output is from an on-chip amplifier that is identical to the pixel amplifier and is located adjacent to the pixel amplifier to provide localized fixed pattern noise for proper background subtraction in the differential amplifier. The Video A 70 and Video B 72 signals and dummy signals COM A 74 and COM B 76 are paired and input to analog signal processors 79 and 80, as herein described for FIG. 9. Analog signal processors 79 and 80 output processed analog signals 81 and 83, respectively for digital processing, as discussed below. It will be appreciated that the terms "horizontal" and "vertical", used above, are relative terms to denote charge movement through FPA 38.

Operation of FPA 38, for either charge coupled devices (CCD) or charge-injection devices (CID), may be divided into two periods. During the first or "static" period, the photocharge integration takes place. The vertical input ports, P1, P2, and P3, are biased at appropriate voltage levels in order to maintain potential wells for accumulating the photocharge. The second or "readout" period is next. The photocharge is moved vertically through the imager to the horizontal registers 66a and 66b and then moved horizontally to form video signals 70 and 72.

Level shifters 54 are required to provide voltage level translations for the logic level clock waveforms from pattern generator 52 and create electric fields within FPA 38 that are effective to transfer the image charge elements from FPA 38 pixels to processors 80. Level shifters 54 are placed on imager header board 36 to be in close proximity to FPA 38 and are designed to dissipate as little power as possible, as discussed below, for high speed operation.

Figure 3:
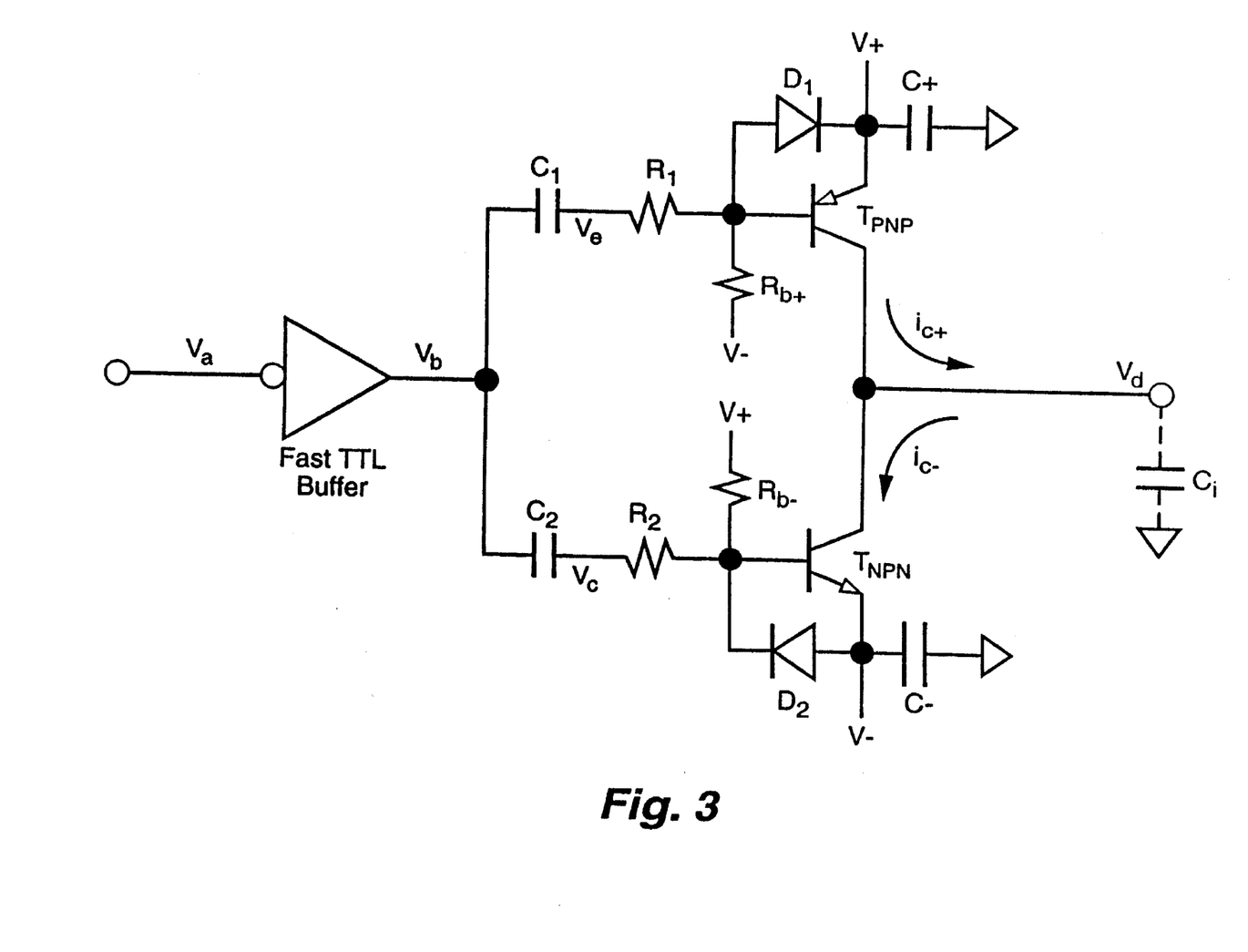
FIG. 3 is a circuit diagram of clock level shifter circuitry.

In an exemplary embodiment, shown in FIG. 3, each driver consists of a fast advanced Shottky TTL buffer integrated circuit that controls a discrete transistor pair level translator/high current driver. A driver can be polarized to either a high- or low-quiescent level, defined by the DC rail voltage $V^+$ or $V^-$. Both the rail voltages can be either positive or negative, as long as voltage V-is lower than voltage $V^+$. Each driver is basically a charge pump made of two complementary transistors ($T_{pnp}$ and $T_{npn}$). The output ($V_d$) is biased to a high level by large resistor Rb+, which biases transistor $T_{pnp}$ slightly to an on condition. Because the CCD clock port load is essentially capacitive, $V_d$ is close to the rail voltage $V^+$. Similarly, Rb− keeps transistor $T_{npn}$ on and the output $V_d$ at the $V^-$ rail level. Either $T_{pnp}$ or $T_{npn}$ can be on exclusively, i.e., they may not be on at the same time.

For example, a negative burst of clock pulses $V_a$ is inverted by the TTL buffer to form pulses $V_b$. The positive leading edge $V_c$ turns on $T_{npn}$, discharging the CCD clock port capacitance $C_i$ to $V^-$ with the current $i_{c-}$. The time constant $R_2C_2$ is not critical, but is selected to initially drive the base at $T_{npn}$ very hard. The discharge current $i_{c-}$ is zero when $V_d$ reaches $V^-$ and only a small current into the base is sufficient to keep the transistor saturated. At the end of the input pulse, the negative edge of the pulse $V_c$ turns $T_{npn}$ off very fast.

The same driving pulse $V_b$ controls the upper transistor, $T_{pnp}$. The leading edge $V_e$ turns off the base current provided quiescently by Rb+. Also, capacitor C1 is charged during the pulse period through R1 and a fast diode, D1. The negative edge of $V_e$ turns on $T_{pnp}$. The collector current $i_{c+}$ charges $C_i$ positive, until the rail voltage, $V^+$, is reached. This charge pumping procedure continues until the end of the pulse sequence.

Quiescently, the level shifter circuit shown in FIG. 3 dissipates a negligible amount of power. Energy stored in the CCD clock port stray capacitance is $C(Vd)^2/2$. During each pulse, the level shifter must dissipate this energy and restore it for the next pulse. Therefore, the clock power dissipation is proportional to the clock pulse rate.

The current supplied by the level shifter circuits can be very high, especially at high clock rates and high power dissipation with a concomitant temperature rise would occur if the full pulse width were sustained during clocking operations. By differentiating the pulse edges, as described below, the input power that must be dissipated is greatly reduced at the high clock rates of the present invention. As an example, the horizontal clock voltage required for a Loral Fairchild model CCD222 sensor is 10 V. In order to achieve the rise and fall times of 5 ns, the average current is 400 mA into the typical capacitance of 200 pF. Vertical clock port capacitance is 10,000 pF. In order to charge these capacitance to 10 V in 100 ns, an average current of 1A is required.

In order to increase the level shifter output current capacity, two parallel PNP and NPN transistors are preferably used in place of the single transistors shown in FIG. 3. Surface mount technology (SMT) components may be used to minimize the size of the circuit. Level shifter circuits have been arranged in narrow strips only 6.25 mm wide for close packaging.

Referring still to FIG. 3, it should be understood that the RC time constant comprised of the clock lines' input capacitance $C_i$ and the "on" resistance $R_{ce}$ of $T_{npn}$ (RC#2) determine negative rise-time (negative-going-polarity) of $V_d$. Similarly, the fall time (positive-going-polarity) of $V_d$ is a function of $C_i$ and $R_{ce}$ of $T_{pnp}$ (RC#4). To meet this criterion, $R_2C_2$ (RC#1) must be $\geq$ RC#2 to provide the fastest possible charging of $C_i$ to $V^+$ and $R_1C_1$ (RC#3) must be $\geq$RC#4 to provide the fastest possible complete discharging of $C_i$ to $V^-$. Shorter time constants for differentiating networks will not result in sufficient time to fully charge $C_i$ to $V^+$ resulting in reduced amplitude for $V_d$. Hence, a priori knowledge of clock line capacitance and drive transistor dynamic impedances when driven into saturation are essential to proper selection of input differentiator time constants.

Figure 4:
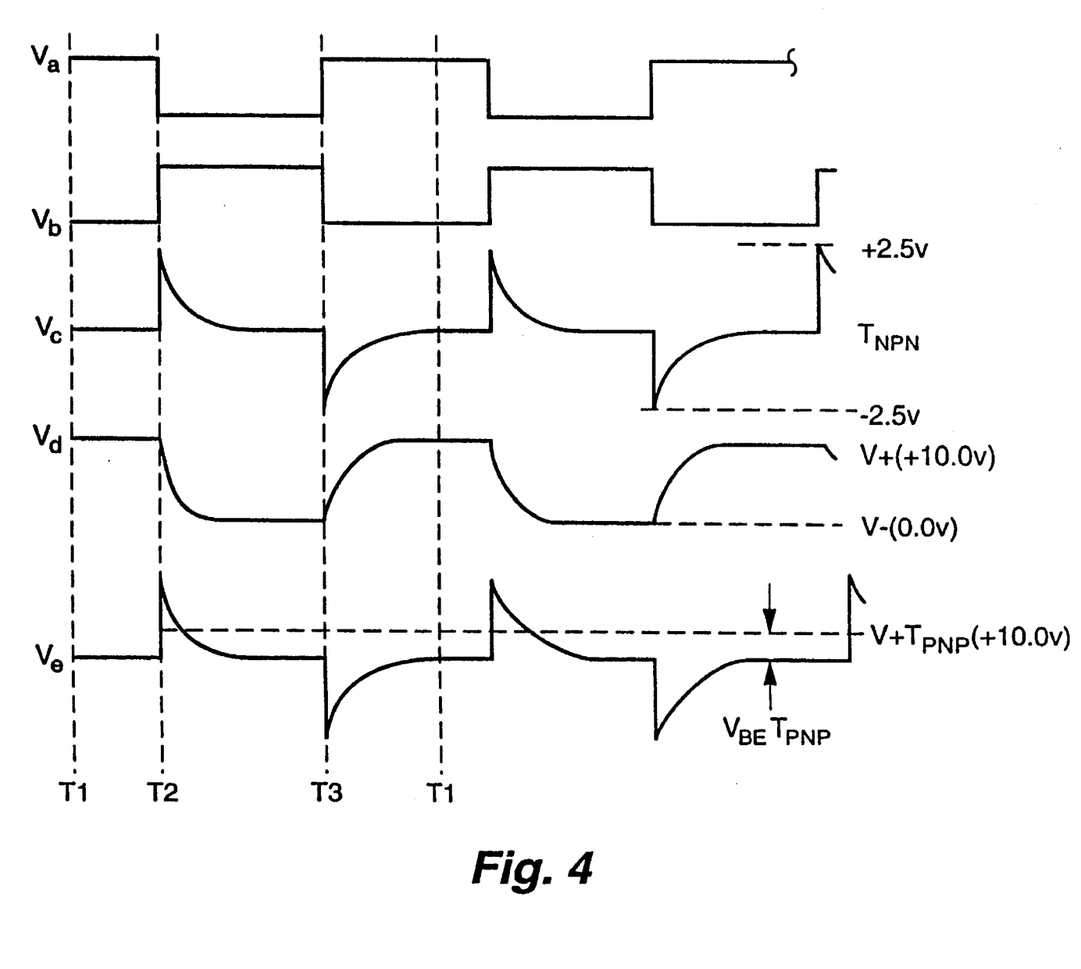
FIG. 4 graphically depicts the differentiating action of the circuit shown in FIG. 3.

FIG. 4 graphically depicts the operation of the level shifter circuit shown in FIG. 3. Clock pulses $V_a$ and $V_b$ are input to the active circuit components. At T1, transistor $T_{pnp}$ is quiescently biased on to $V^+$ by $R_b$+ so that $V_d=V^+-V_{ce}$ ($T_{pnp}$) and $C_i$ is approximately at $V^+$. The leading positive edge of $V_b$ at T2 places $V_c$ and $V_e$ at an initial high level to turn on $T_{npn}$ and turn off $T_{pnp}$; $C_i$ then discharges with time constant RC#2 toward $V^--V_{ce}$ of $T_{npn}$. $V_c$ and $V_e$ discharge with time constants RC#1 and RC#3, respectively, to turn off $T_{npn}$ and turn on $T_{pnp}$. The trailing negative edge of $V_b$ at T3 places $V_c$ and $V_e$ at a low level to completely turn off $T_{npn}$ and turn on $T_{pnp}$; $C_i$ then charges with time constant RC#4 toward $V^+-V_{ce}$ of $T_{pnp}$. It will be appreciated from the waveforms shown in FIG. 4 that the transistors deliver power for only short time periods so that little energy is dissipated in the transistors and temperature problems are reduced.

Figure 5:
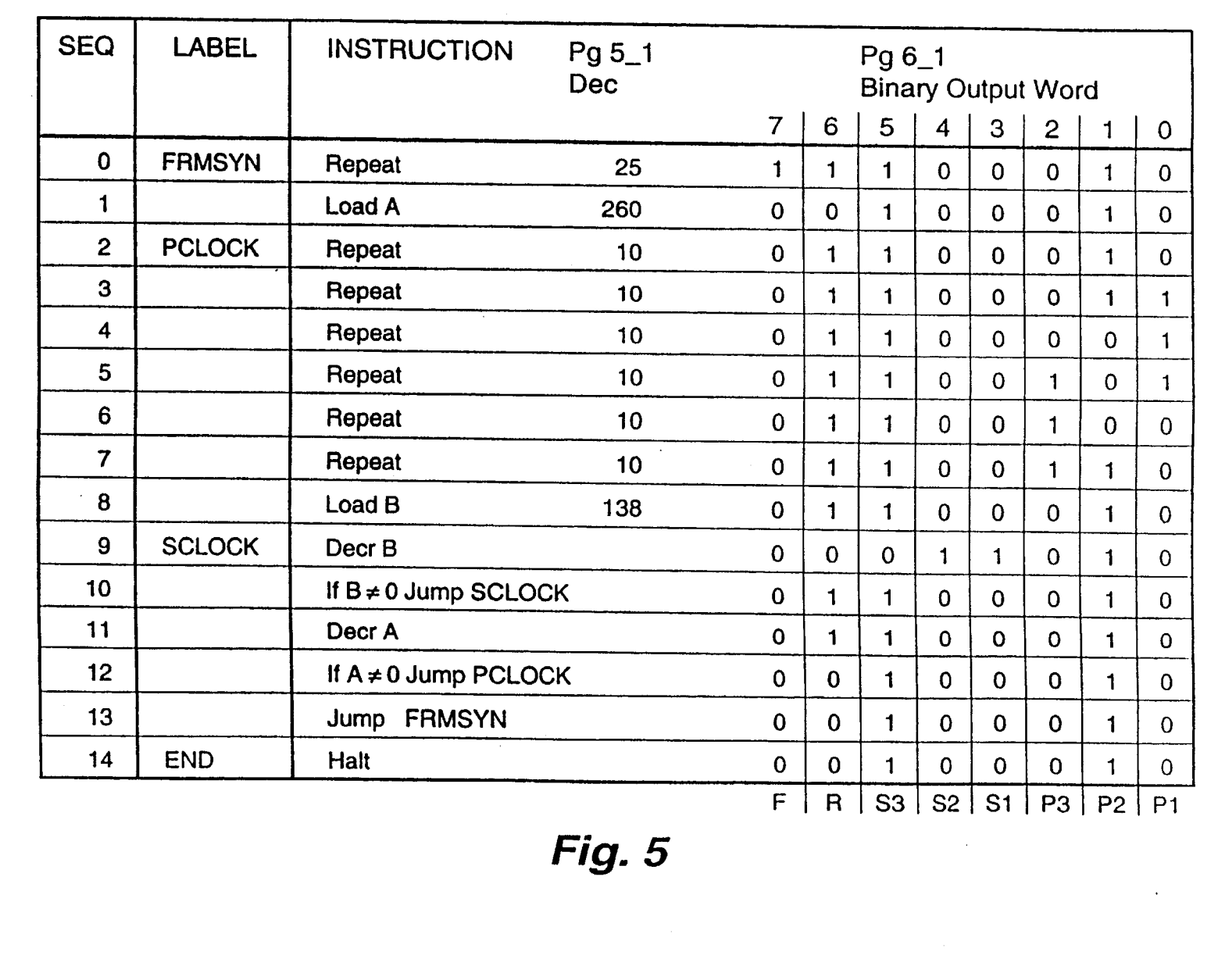
FIG. 5 illustrates a program instruction set for generating the waveforms shown in FIG. 6 for clocking charge from an imager being tested.
Figure 6:
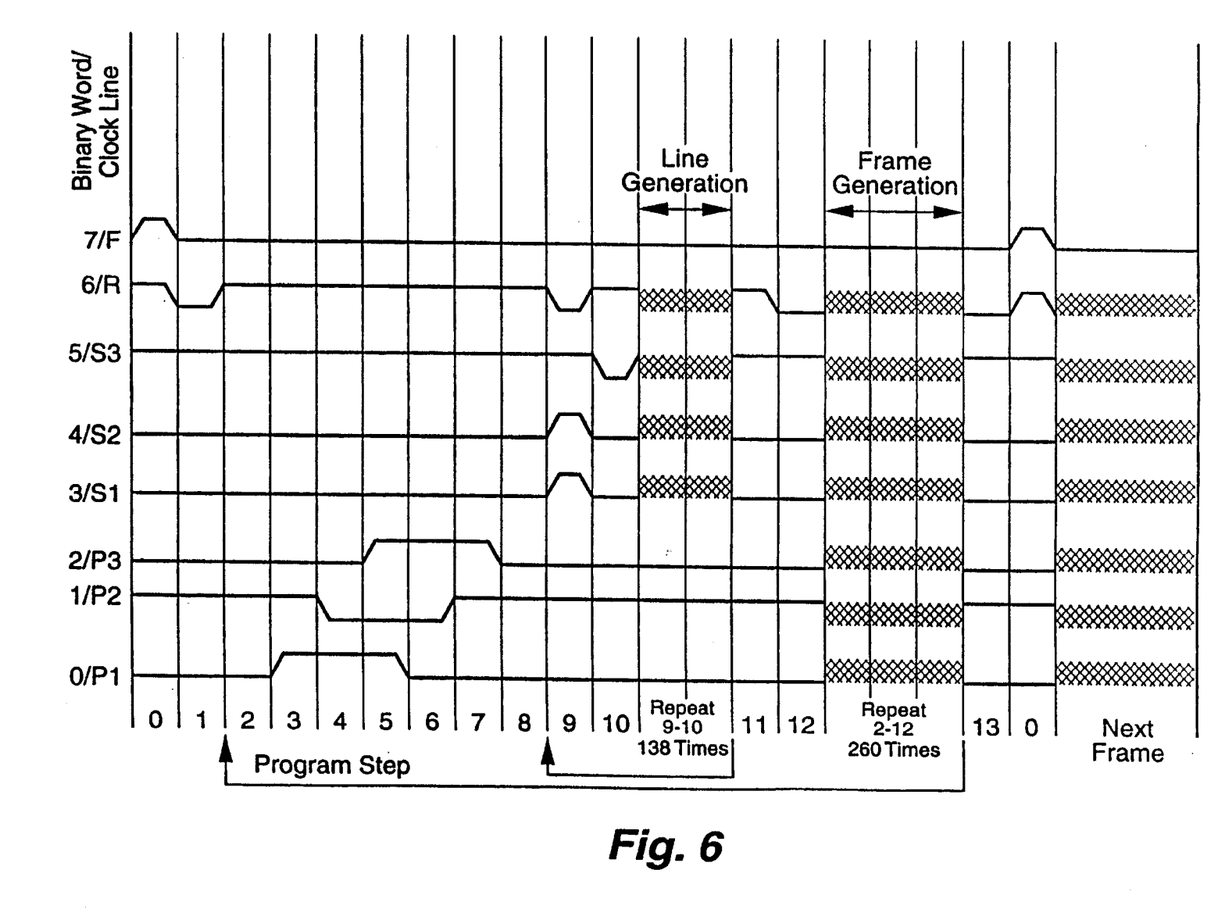
FIG. 6 illustrates a timing diagram depicting the waveforms for clocking image charge from pixels.

FIGS. 5 and 6 illustrate an exemplary program for use with waveform generator 10 (FIG. 1) to output a sequence of pulses in proper phase for clocking an image from a solid state imager, e.g., imager 38 (FIG. 2). Waveform generator 10 may be formed from a Tektronix DAS 9200 Digital Analysis System with 92SX109 (algorithmic) and 92SX118 (sequential) Pattern Generator cards. The algorithmic card, 92SX109, contains and executes the pattern generation program, e.g., the program shown in FIG. 6, and contains 16 low-speed channels, which can be multiplexed to give 8 high-speed channels. The 92SX118 pattern generation card has twice as many channels as the 92SX109 card, 32 low speed (up to 50 MHz) or 16 high speed (up to 100 MHz), and operates sequentially, i.e., following a program sequence 1,2,3, . . . ,n, or following the algorithmic sequence of the 92SX109 board. Output voltage levels can be adjusted to TTL or ECL levels.

The program shown in FIG. 5 uses the algorithmic (92SX109) card as a first programmable section to generate to define a waveform shape, and the sequential (92SX118) card as a second programmable section to form a replication sequence of the waveform shape. The program has five fields: program sequence number, label field for a logical identifier, instruction field/instruction qualifter (numerical for counters and loops, labels for conditional statements) and binary numbers to define the patterns output from frame pattern generator 52 (FIG. 2). The least significant bit 0 defines the vertical clock phase P1, bit 1 is vertical clock phase P2, and bit 2 is vertical clock phase P3. Continuing, bit 3 defines serial output phase S1, bit 4 defines serial phase S2, and bit 5 defines serial phase S3. A reset signal is determined by bit 6 and a frame synchronization signal is determined by bit 7 to indicate the beginning of a new frame.

Sequence 0 defines the frame synchronization duration and polarity, and contains the label FRMSYN that defines the return point after a frame is completed. Sequence 1 defines the number of lines that constitute a frame. Here, 260 (decimal) is used, which overclock the imager by 4 lines. Because the DAS 9200 base clock rate will define the serial (S) clock at a ratio of 2:1, the program steps for the vertical (P) phases are expanded in time. This is done by using a command to Repeat each step 10 times (Sequence 2–7). When coupled with defining the overlap of P phases by 3 sequences, the P clock duration is expanded 30 times over the serial or S clock duration. Sequence 8 defines the number of pixels to be clocked per line (138 here), resulting in ten overclocked pixels/line. The next two sequences 9 and 10 define the serial S phases and reset pulses. The S1, S2, and S3 pulses are later passed through passive delay generators 18, 22, and 24 to allow proper overlap conditions so that the potential wells created in the CCD for charge transfer will overlap in time. This overlap provides a traveling charge packet that arises from sequential state changes of the CCD clock lines. Preferably, the overlap can be varied up to ±30%, or up to 60% total overlap. When all 138 pixels have been serially clocked out, sequence 11 decrements the lines/frame counter and sequence 12 tests whether all lines have been output. If more lines need to be clocked out, the program jumps to sequence 2 and the loop repeats. When all lines have been output, sequence 13 returns the program to sequence 0 to begin a new frame.

FIG. 6 illustrates the clock timing diagram output by the program sequence shown in FIG. 5. Each sequence of P pulses moves one line of transverse pixels to the next lower line. Each sequence of S pulses serially clocks one row of pixels from the transverse line, where each pixel produces a voltage pulse at the output of an analog signal processor 80 (FIG. 2) that receives the pixel charge. Thus, a complete sequence of 138 S pulses clocks a complete line of pixels from the CCD and the entire sequence of P pulses and 138 S pulses is repeated 260 times to form a complete picture frame, i.e., clock all of the pixels forming a single image.

Referring again to FIG. 2, the processed video output signals 81, from analog signal processing circuits 79, 80 on imager header board 36 are digitized, which may be conveniently done using a multi-channel digital storage oscilloscope (DSO) 44 (FIG. 1 ), such as a LeCroy Model 9424 DSO. The DSO performs the initial high-speed digitization and storage of the solid-state imager video pixel values. Digitization is done on a pixel-by-pixel basis by externally clocking the digitizer in synchronization with the solid-state imager's pixel clock. High density pixel arrays may require the use of DSO's with higher memory capacity, such as the LeCroy 9314 with 1 megabyte of memory per channel. Image analysis may then be done by downloading the stored data files to a computer, e.g., a Compaq 386 PC, for reconstruction and analysis with commercial software, e.g., Research System's Interactive Data Language.

Thus, a solid-state imager can be clocked at a high rate to simulate high-speed image acquisition and readout. The performance of the imager may be determined with respect to such characteristics as point-spread-function, charge-transfer-efficiency, contrast-transfer-function measurements, area crosstalk, and sag or droop characteristics. Suitable light sources include a 532 nm frequency-doubled Nd:Yag laser and Xenon strobes. A variety of calibrated pinhole arrays and standard resolution patterns enable these characteristics to be determined. Once the high speed data is obtained and stored, the data then can be reconstructed and analyzed using conventional video formats.

Figure 7:
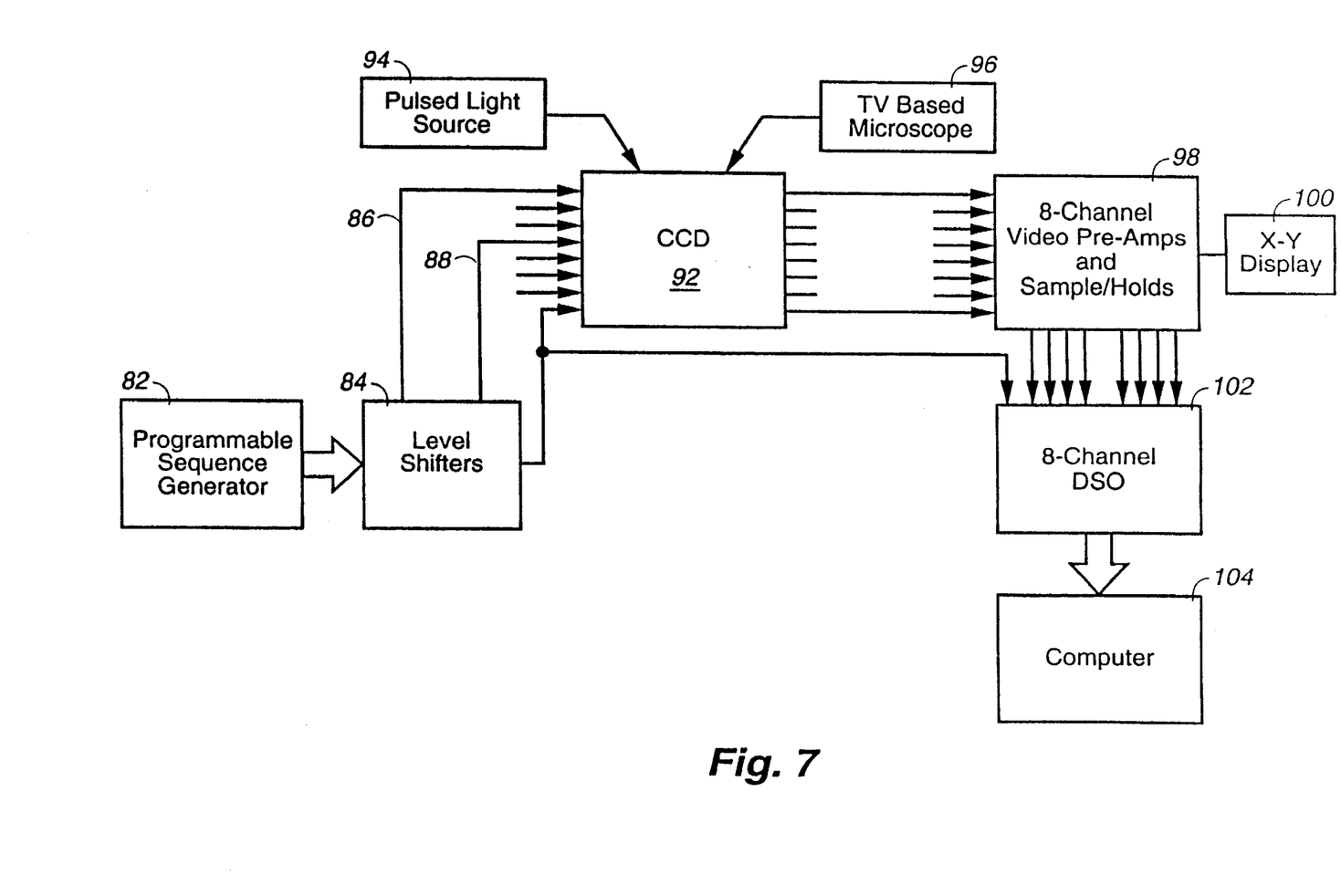
FIG. 7 is a block diagram illustrating a second embodiment of the present invention.

Another embodiment of a programmable high-speed solid state imager test station is shown in block diagram format in FIG. 7. Programmable sequence generator 82 is preferably a Tektronix DAS 9200 with 92SX118 and 92SX109 pattern generator cards and outputs a programmable pulse sequence to level shifters 84, which output clocking pulses at a voltage level effective to clock charge from pixels that form imager 92. The pulse rate can be varied by programming the pulse sequence generated by generator 82 or by selecting a different system clock rate through either the DAS internal memory or by using an external frequency source. Level shifters 84 output signals 86 (horizontal clock) and 88 (vertical clock) to clock charge through an image section and an output register of FPA 92. Pulsed light source 94 provides excitation for charge generation in pixels of FPA 92. TV based microscope 96 is provided in a preferred system to enable visual examination of the surface of FPA 92. As discussed above, clock drivers/translators 84 are high-speed, high-current switches that output a series of voltage level pulses for clocking charge from FPA 92 to an 8-channel video preamplifier and sample/hold circuit 98, i.e., the analog processing circuits 80 shown in FIG. 2 and further discussed below. These analog signals may then be output to an X-Y display 100 for real time viewing and/or digitized and stored in 8-channel DSO 102, such as two LeCroy 9424s or 9314s, at the rate the pixels are clocked from FPA 92. The stored data is then provided to computer 104, which may be an IBM PC/AT or comparable system, for processing with a suitable software routine, e.g., Interactive Data Language 2.2

Figure 8:
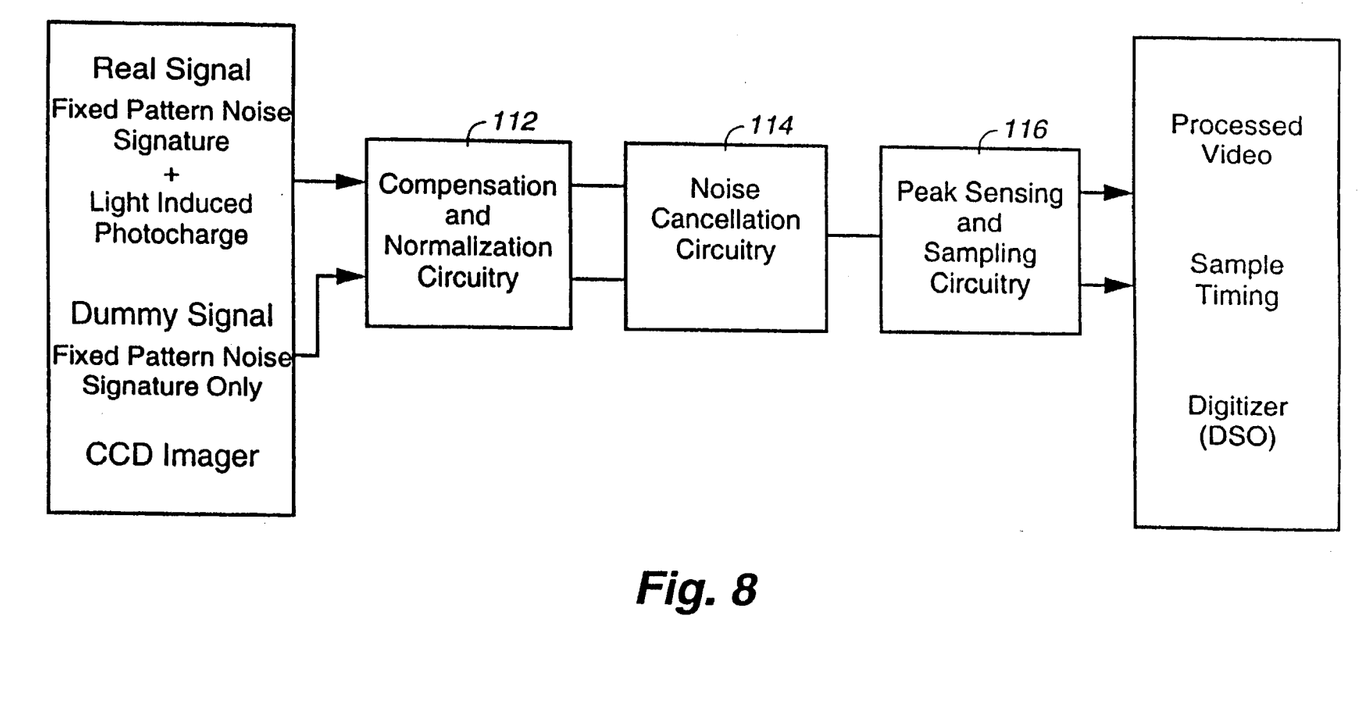
FIG. 8 is a block diagram for analog signal processing.
Figure 9:
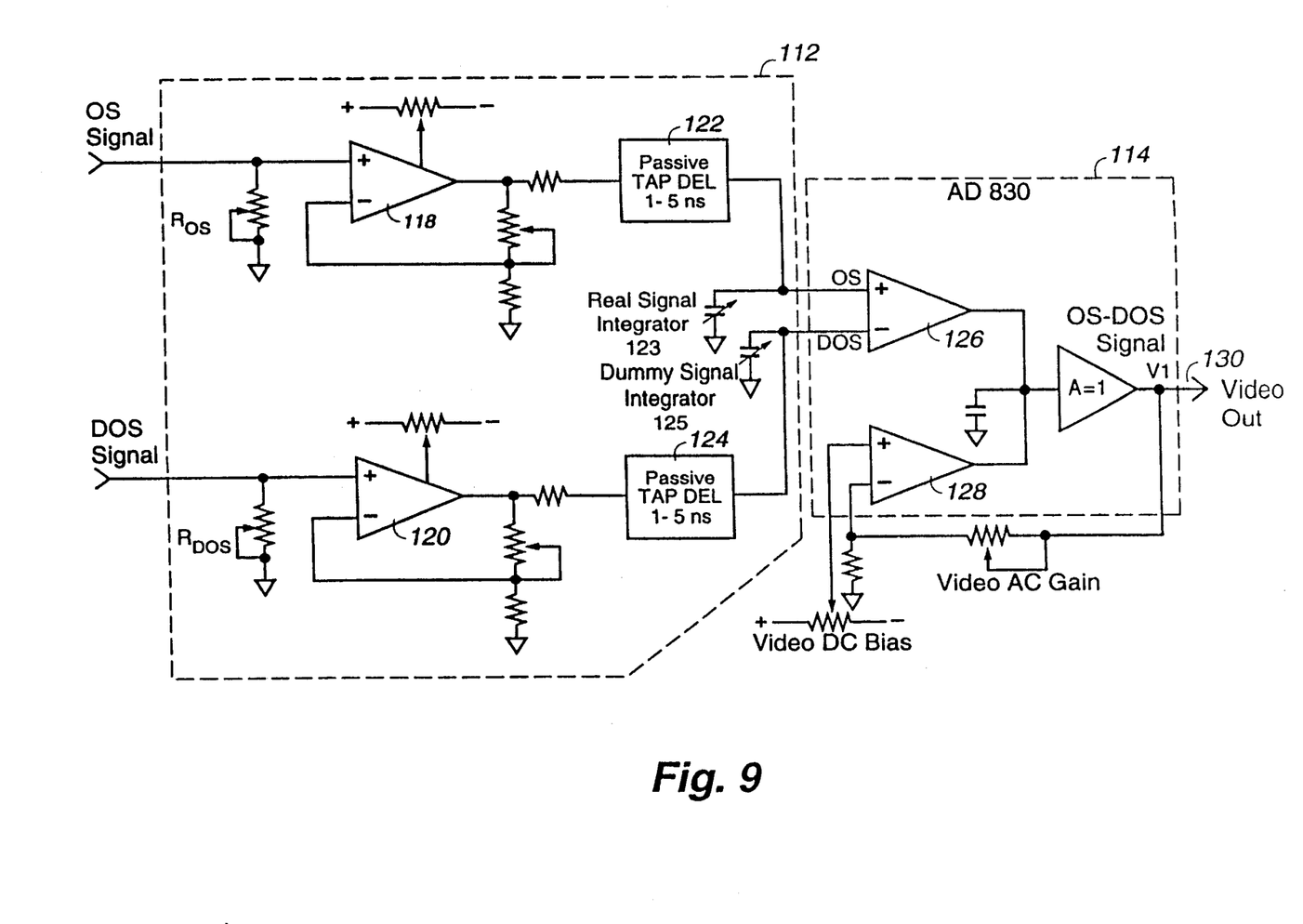
FIG. 9 is a circuit schematic for CCD output signal compensation and noise cancellation.
Figure 11:
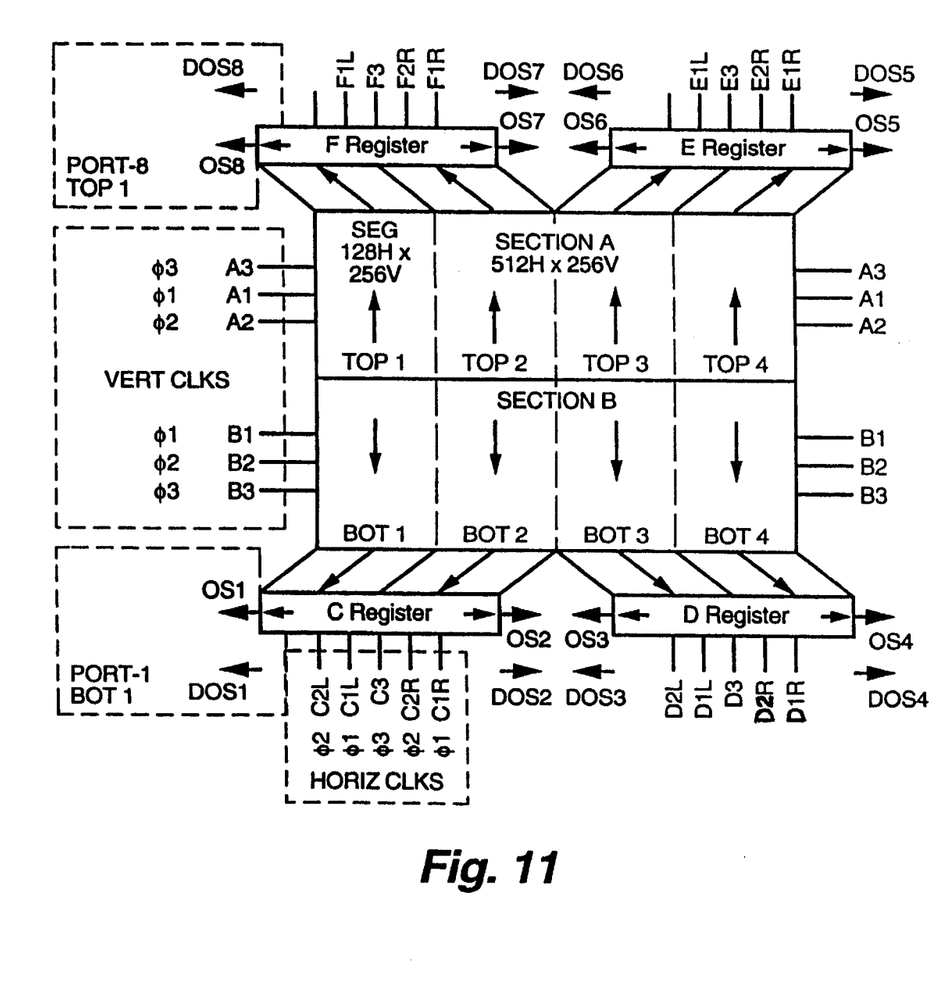
FIG. 11 is a block diagram of input/output leads of a commercial CCD.

Analog processing circuitry FIG. 8 (items 79 and 80, FIG. 1, and item 98, FIG. 7) that enables a high rate of readout of light-induced charge from pixels forming FPA 38 (FIG. 1) or 92 (FIG. 7) consists of three basic blocks or functions. First, time phase, DC bias, and AC gain compensation circuitry 112 provide for the independent preprocessing of the "real" and "dummy" video output waveforms prior to applying to noise cancellation circuit 114 for subtraction or cancellation of fixed pattern noise signatures, commonly referred to as electrical crosstalk. Modern CCD architecture such as shown in FIG. 2 and EEV CCD-13, FIG. 11, are designed with a pair of amplifiers, e.g., labeled "video A" 70 and "com A" 74 and "video B" 72 and "com B" 76 for the CCD shown in FIG. 2 and labeled "OS" (for output source of on-chip source follower FET) for the "real", and "DOS" for the "dummy" for the EEV CCD-13 in FIG. 11. Theoretically the two amplifiers, e.g., amplifiers 70 and 74, are designed to be identical, and therefore should provide exactly the same fixed pattern noise signature. In practice they can differ in wave form structure, quiescent DC bias current, AC gain, and propagation delay to the output port, such that without individual and proper compensation, incomplete cancellation of the "dummy" component by simple differential amplifier can result in four error components from structural, time phase, DC bias, and AC gain differences. Compensation circuitry 112 is shown in FIG. 9 as variable gain amplifiers 118, 120, corresponding passive tap delay lines 122, 124 with variable delays of 1–5 ns, and "real" signal integrator 123 and "dummy" signal integrator 125.

Noise cancellation circuit 114 provides fixed pattern noise cancellation through differential amplifier 126 and also establishes a new DC voltage level reference through clamping amplifier 128 (either static or gated in time to coincide with key phases of the CCD video waveform) to output video waveform 130 for peak sensing and sampling circuit 116 in the analog processing chain.

Figure 10:
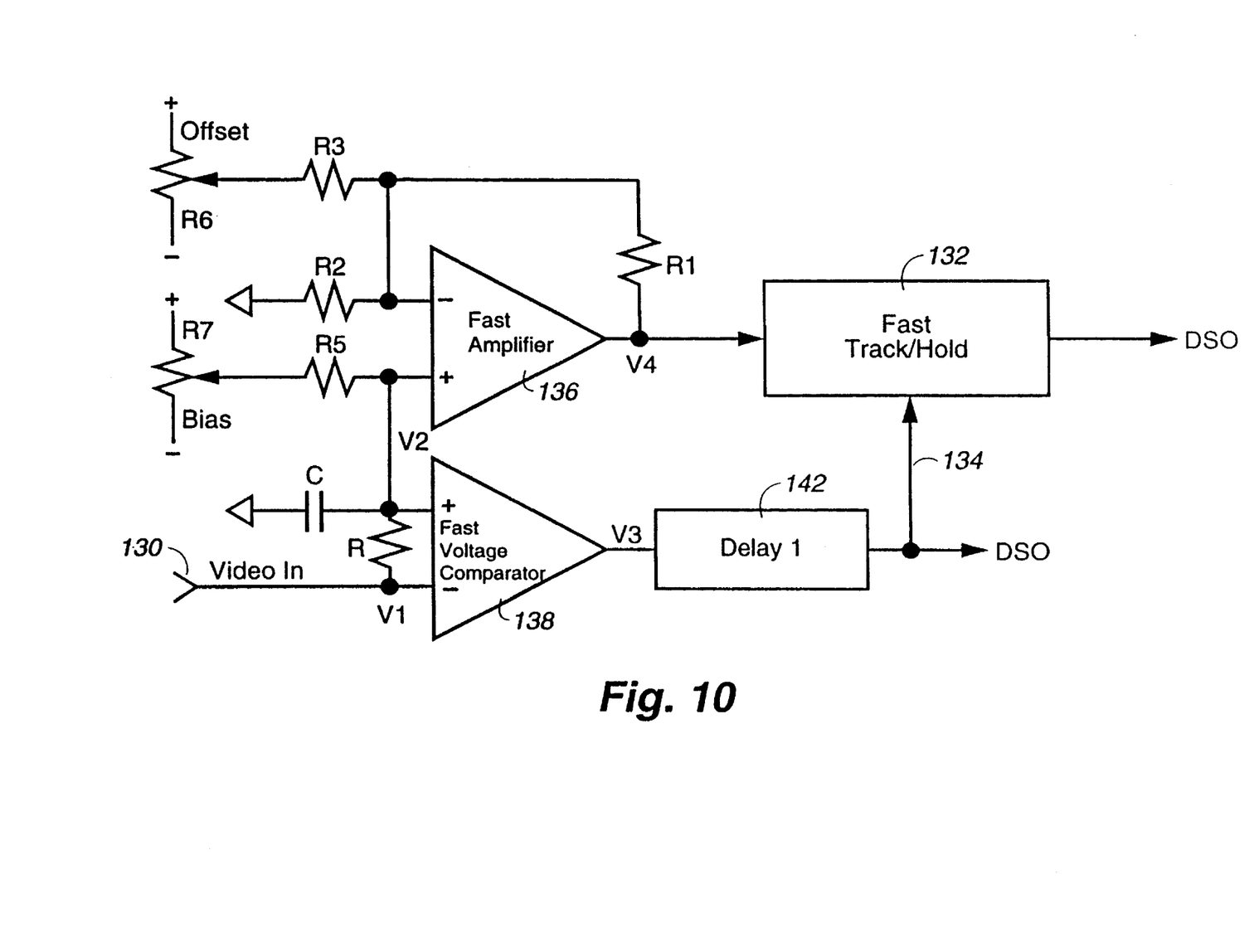
FIG. 10 is a circuit schematic for a peak sample and hold circuit.

Further, peak sensing and stretching circuitry 116 is shown in FIG. 10 and senses the peak charge of individual pixels and holds it until the next pixel's charge is clocked off-chip. Self-generated clocks are designed to follow changes in time (or period) between successive sensed peaks (from one pixel to the next) which result from changes in both pixel clock frequency and intensity of input light imaged onto the FPA. The self-generated clocks are essential to provide Track and Hold amplifiers 132 with proper time-phased "strobe" commands 134 to automatically, accurately, time-variantly sample the CCD pixel charge from peak sensing circuitry comprised of fast voltage comparator 138 and fast amplifier 136. These functions are required when pixel signal rates and amplitudes are fast and large enough to exceed band-width and slew-rate capabilities of the CCD on-chip amplifiers. At slower pixel rates (frequency), the peak sensing, stretching and self-generated clocking is not essential since pixel charge reaches its final value in the amplifier prior to arrival of charge from the next pixel.

Fixed pattern noise cancellation in circuitry 114 will be incomplete if noise signatures of the OS and DOS waveforms are not identical before they are applied to differential amplifier 126. The time-phase differences between the two waveforms cause a differentiated waveform to output from differential amplifier 126. Gain differences cause a non-zero amplitude for the signal portion of the waveform from differential amplifier 126. Differences in quiescent DC bias currents cause the absolute DC level of the non-signal portion to vary from an ideal value of zero volts from differential amplifier 126. In summary, if the OS and DOS waveforms are identical, complete cancellation results from differential amplifier 126 and the output would be a waveform of flat DC level of zero volts with no structure whatsoever.

The circuitry of FIG. 9 more particularly shows the compensation and normalization circuit 112 and noise cancellation circuit 114 shown in FIG. 8. The circuit components apply all necessary corrections to the OS and DOS noise signals independently and then inputs corrected signals to differential amplifier 126 for proper and complete cancellation. Normalized DC bias and AC gains for the OS non-noise signal and DOS noise signal, are applied through amplifier 128 to form the light-induced photo charge signal 130 for input to peak sensor circuitry 116.

The "real" and "dummy" waveforms from the CCD output amplifier are individually fed to non-inverting inputs of high bandwidth (−3 dB at 200 MHz) fast settling (0.05% in 12 ns) operational amplifiers 118, 120 (Comlinear CLC-400). The gain of each amplifier is adjustable, allowing both real and dummy signals to be normalized to equal amplitude. The DC level of each amplifier is also adjustable, allowing for compensation of different actual DC voltage levels from the real and dummy output amplifier quiescent source currents flowing into their respective source resistors $R_{OS}$ and $R_{DOS}$. Passive tapped delays 122 and 124 (Rhombus 200 MHz bandwidth versions) allow adjustment of time-phasing between the real and dummy signals (a total range of 10 ns in 1 ns resolution is provided) to align them exactly in real time for proper cancellation in differential amplifier 126 (Analog Devices 830). The inputs to differential amplifier 126 are connected to variable capacitors 123 and 125 to allow rise-time "spoiling" of the real and dummy signals by slightly integrating them, to control waveform structuring for "shape" normalization prior to subtraction of the dummy ("DOS") waveform from the real ("OS") waveform in differential amplifier 126 to provide cancellation or elimination of all fixed, pattern noise signatures from the CCD in video output signal 130.

Although the CCD's charge transfer efficiency may still be acceptable at high rates, the frequency bandwidth of its photo charge detecting amplifier is usually insufficient. The result is a video signal 130 comprised of sharp voltage pulses corresponding to photo charge from individual consecutively clocked pixels. The voltage pulse amplitudes are proportional to the input illumination intensity incident on the CCD array. At high clock frequencies the voltage pulse peaks are too narrow for sampling by the fastest state of the art analog-to-digital converters (ADCs). At larger voltage amplitudes, corresponding to higher input illumination intensities (brighter scenes), the amplifier slewing causes the time required to reach peak values to vary as a function of photo charge magnitude. These resulting phase differences in real time between voltage peaks and the pixel clock waveform will cause ND conversion errors from ADC sampling at the wrong time. A new, very fast self-clocking peak detector/stretcher circuit, shown in FIG. 10, eliminates these problems. The circuit uses a very fast zero-crossing discriminator 138 as a peak detector, and source of timing for regeneration of clocks, and a 300 MHz track and hold (T/H) amplifier 132.

The video signal analog to digital processing is done in two steps. The video signal 130 is first conditioned by a very fast peak stretcher circuit, making the pixel waveforms flat after the peak is reached. This signal is delayed through Delay 1 142 and applied to track/hold amplifier 132. A flash ADC or system digitizer can access the data at this time. The conversion error is thus reduced since the time of sampling is correct and the ADC has time to settle.

Basically, the stretcher circuits comprise a peak detecting voltage comparator 138 and a very fast T/H amplifier 132. Video signal 130 is slightly integrated by a RC network across comparator 138 inputs. Comparator 138 is biased to produce output only during the rising edge of signal 130 to keep the T/H amplifier 132 in the track mode. Comparator 138 switches to hold when both inputs become equal, i.e. exactly at the signal 130 peak point. T/H amplifier output 132 remains flat after the peak until comparator 138 detects the rising edge of the next video signal 130.

Video signal 130 V1, controls the inverting input of fast voltage comparator 138. The same signal, slightly integrated by the RC network (V2), inputs to the non-inverting input of amplifier 136. During the rising edge of video signal 130, V1 exceeds V2 and cause comparator 138 output, V3, to switch to a low or track mode. The positive transitions of comparator 138 output, V3, occur exactly at each peak point of V2. Properly shaped and delayed, V3 controls the strobing of a fast track/hold amplifier 132 and may be used as the external clock for the test station digitizer, such as the LeCroy DSO 102 (FIG. 7).

Amplifier 136 clamping output, V4, is internally delayed due to the propagation delay and slewing, and is timed to coincide with the T/H amplifier strobe 134. Also, recovery from clamping must be very fast. The positive edge of V3 must be delayed to coincide with the peak of V4. This timing must also be set to compensate for the difference in propagation inside track and hold amplifier 132. The time difference, usually less than a nanosecond, is specified by the T/H amplifier manufacturer and can be either positive or negative. The peak stretched T/H amplifier 132 output, V5, is available for digitizing by the test station digitizer LeCroy DSO 102 (FIG. 7).

High-speed operation of solid-state imagers or FPAs are enhanced by providing multiple video output ports that permit parallel readout of several segments of the total array simultaneously. Additional increases in readout speed are accomplished using bidirectional clocking of pixel charge, both vertically and horizontally. Referring to FIG. 11 for the EEV CCD-13, this is accomplished by shifting rows (or lines) in the upper half of the array (Section A) upward into the top horizontal registers E and F, while simultaneously shifting rows in the lower half of the array (Section B) downward into the bottom horizontal registers C and D. Each row is composed of 512 pixels, 128 pixels from each of the four segments of one section. The first half of a row (pixels 1 to 256 corresponding to segments 1 and 2) are loaded into one horizontal register (register F for Section A, register C for Section B). Similarly, the second half of that row (pixels 257 to 512 corresponding to segments 3 and 4) is loaded into a different horizontal register (register E for Section A, register D for Section B). Each row is essentially truncated into two "half rows" by this device topology. Once a "half row" is loaded into its horizontal register, pixel charge within the "half row" is again simultaneously clocked (or shifted) left and right into output amplifiers located at each end of the register. For example, register F shifts pixels from TOP segment 1 bidirectionally, pixels 1 to 128 left into video Port 8 (OS8), and pixels 129 to 256 right into Port 7(OS7). This highly parallel readout automatically provides at least an 8X improvement in readout speed for a given pixel rate.

EEV CCD-13 is designed to provide eight real output video ports (designated "OS") and eight dummy output ports (designated "DOS"), as shown in FIG. 11. Two real ports read out each half of one of the four horizontal registers, hence the eight real outputs.

EEV CCD is a three phase-device, therefore clocking code must generate three vertical or parallel clocks for shifting charge from an entire row of pixels (in parallel) from the image section to the output horizontal or serial registers. Similarly it must also generate three horizontal or pixel clocks for shifting the row charge laterally through the serial register, one pixel at a time, once per clock cycle. Because of the readout architecture described earlier above, the CCD reads out 1 segment per output video port, requiring 256 vertical clocks and 128 horizontal clocks. The clocking code accomplishes this by providing two nested "do-loops" to output the two sets of three-phase clocks. The "load B" instruction loads a counter with the number 256, the quantity of lines or row for one section. The "load A" instruction loads a second counter with the number 64, which is one half the quantity of pixels for one segment. This is done because two cycles of horizontal clocks are inside this loop. Alternatively, the counter could have been loaded with the number 128 and the quantity of horizontal clock cycles inside the loop would be reduced to one.

After loading of the counters, the inner loop begins outputting TTL or ECL logic level waveforms corresponding to the code binary pattern. After two cycles of Hφ clocks have been generated, the "A" counter is decremented by one, and tested against zero to determine if the full 64 counter cycles have been generated, at which time the code execution starts the vertical clocks. These waveforms correspond to binary patterns for output at the end of the horizontal clock sequences, and are replicated 256 times by decrement and test instructions in similar fashion to that described for horizontal clocks. These binary patterns are converted to ECL or TTL level waveforms. These waveforms are applied to the level shifter electronics FIG. 7, item 84 (circuit shown in FIG. 2) which subsequently input to EEV CCD-13 and more explicitly, the Vφ1, Vφ2, Vφ3, and Hφ1, Hφ2, Hφ3, and pixel reset inputs shown on FIG. 11. Actual time-phasing and overlap of vertical clocks is accomplished by the binary code. For the horizontal clocks, the overlap is accomplished by using the internal phase control provided by the Tek 9200 DAS.

Computer 104 shown in FIG. 7 may comprise a scan converter (FIG. 12) to reformat high scan rate data to RS-170 video rate to allow the use of hardware (displays, monitors, digitizers, etc.) and software (display, analysis, processing, etc. codes) commercially available to support conventional RS-170 format video. Arbitrary function generator (AFG) (1) generates RS-170 synchronization (sync) and timing waveforms and (2) acquires the stored digital data from the high speed DSO 9.8 memory, converts the data to analog form and inserts the data between successive RS-170 sync waveforms, to produce a composite video waveform conforming to the RS-170 format. This technique can support recording and subsequent scan conversion of either single port or multiport imagers by specialized software routines. The process involving a single video channel or port is described below.

Referring to FIG. 7, a test station scan converter, in complete form, accommodates eight channels of video, and requires two four-channel high speed DSOs, LeCroy Model 9424, and four two-channel AFGs, LeCroy Model 9109. Equipment for processing a single channel is described with reference to FIG. 12. Data flow between the DSO 98 and AFG 150 is thru a GPIB interface to work station PC 154. Resident in PC 154 is commercial waveform generation software, LeCroy Easy Wave Version 2.2 and Asyst module-4 (available from Asyst Software Technologies) for GPIB/IEEE communications. The Easy Wave software is used to develop the RS-170 waveforms and store them as digital data files in AFG 150 memory 156 for subsequent down loading to nonvolatile waveform storage memory 158 of AFG 150. When stored in the AFG memory 156, the waveforms are instantly available for file transfer to high speed waveform memory 158 by entering a file name. The high speed digitized video from the FPA under test resides in the nonvolatile memory of DSO 98 following a data capture event or frame grabber operation. Digital data are transferred to the PC 154 memory using Easy Wave instructions. Each byte of data corresponds to a single pixel amplitude quantized to 1 part in 256, or 8-bits. The DSO 98 amplitude and offset settings are also transferred to give absolute values to the 8-bit words for reconstruction to analog form in AFG 150. The data are logged in a file and transferred to the AFG's waveform storage memory 156. With the RS-170 waveform files in storage, the files are called in proper sequence and transferred to the AFG high speed memory 158 to mix the RS-170 video sync waveform with the high speed digitized video data and form the total RS-170 composite video waveform which is then outputted from the AFG for processing using RS-170 hardware and software. Proper timing for RS-170 format is set by AFG 150 internal precision programmable timebase 162 which generates appropriate clocking and code sequencing. Digital data are not degraded, mislocated, or otherwise compromised by this process because spatial coordinate information (from the FPA array) is preserved by DSO 98 sampling, which is driven by the FPA pixel clock, and further preserved by Easy Wave file organization using the memory address counter and file sequencing code of AFG 150.

Figure 12:
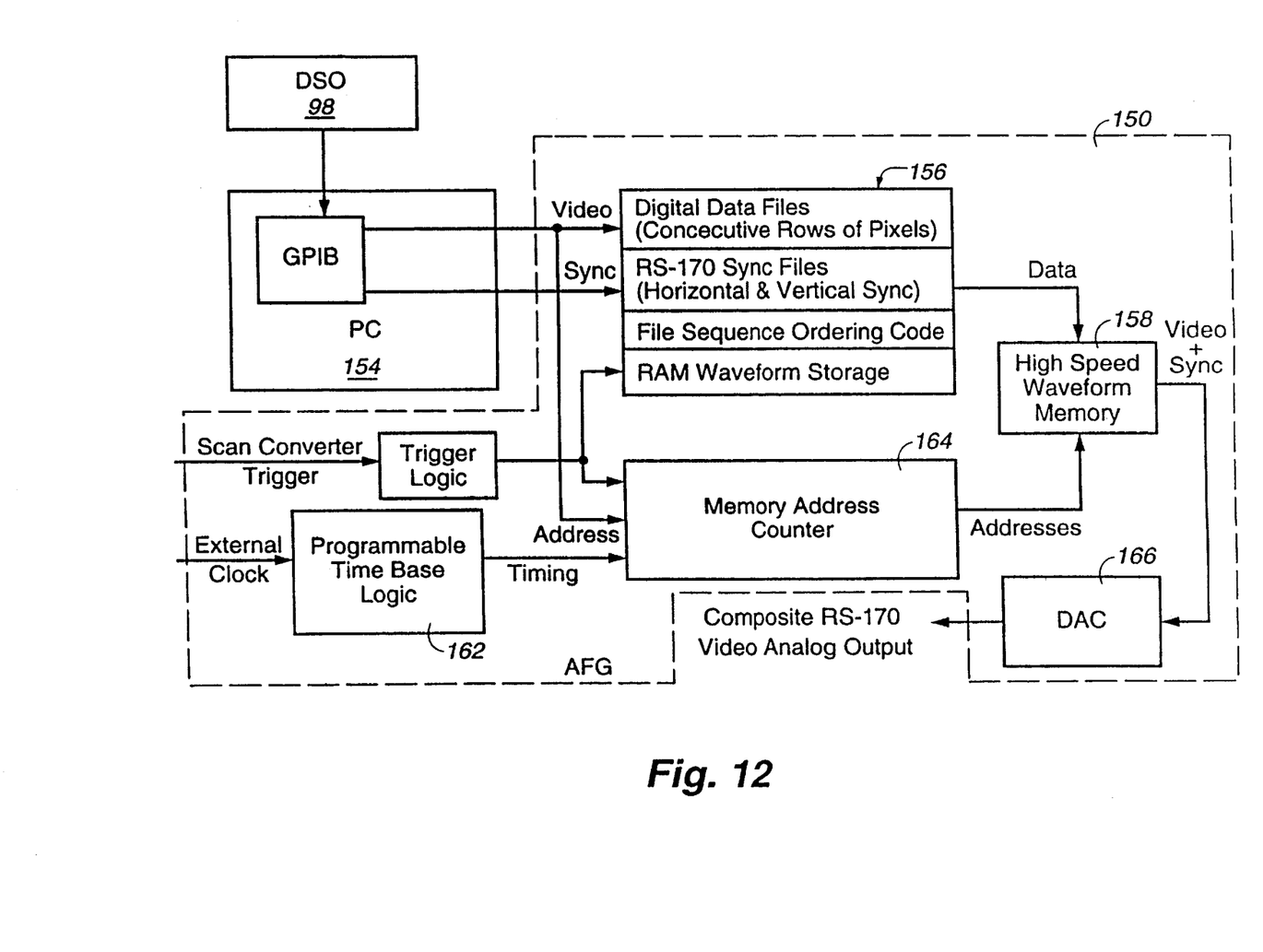
FIG. 12 is a block diagram of pixel processing circuitry to provide standard video format output images.

AFG 150 is an instrument capable of generating complex waveforms. The waveform to be generated is defined by sequences of digital numeric values or words from counter loaded into high-speed memory 158. Each successive memory location contains a digital value proportional to the amplitude of the time-varying waveform points to be generated. A high-precision programmable time base consecutively loads the stored digital words into a digital-to-analog converter (DAC) 166. DAC 166 outputs an analog output that follows the waveform corresponding to the digital values stored in waveform memory 156 of the AFG.

In effect, RS-170 waveforms are used to establish proper timing, phasing, and structure protocol and are resident in the AFG memory. The digitized data corresponding to a line or row from the solid-state imager under test is loaded from the DSO into AFG memory to be outputted in between the horizontal sync intervals of the RS-170 waveform. In this manner, high pixel rates from the imager are down-converted to RS-170 rates, allowing the use of readily available RS-170 display and analysis software for evaluation.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A test station for determining the performance of a solid state imager, comprising:

a programmable waveform generator for outputting clock pulses at variable rates;

an imager header board for mounting a solid state imager to be tested, including clock level shifters for receiving said clock pulses and outputting readout pulses effective to clock charge from pixels forming said solid state imager and amplifiers effective to amplify output charge clocked from said solid state imager, wherein each one of said clock level shifters includes means for differentiating said output clock pulses so that said solid state imager is driven by leading and trailing edges of said clock pulses to reduce power dissipation in said clock level shifters;

analog circuit means receiving said output charge clocked from said solid state imager for canceling noise in output pulses formed by said output charge and peak sensing and holding means to sequentially hold a peak value of each of said output pulses;

high speed digitizer means for receiving said peak value of each one of said output pulses and outputting a digital representation of each one of said output pulses; and video means for displaying an image associated with said digital representation of said output pulses corresponding to said output charge clocked from each one of said pixels.

2. A test station according to claim 1, wherein said programmable waveform generator includes a first programmable section for defining a waveform shape and a second programmable section to form a replication sequence of said waveform shape.

3. A test station according to claim 1, wherein said video means for displaying an image includes storage means for storing said digital representation of said output pulses; and computer means for reconstructing said digital representation in a video image.

4. A test station according to claim 1, wherein said peak sensing and holding means further includes:

tracking and holding circuitry for detecting and holding said peak value of each one of said output pulses;

strobe means for generating a strobe pulse on the occurrence of said peak value of each of said output pulses, wherein said tracking and holding circuitry is responsive to said strobe pulse for outputting said peak value.

5. A method for testing the response of a solid state imager to an input pattern, including the steps of:

exposing said solid state imager to a test pattern to generate a pattern of light-induced charges;

generating a sequence of clock pulses at a determinable rate to clock charges from pixels on said solid state imager;

differentiating each one of said clock pulses to provide output signals from leading and trailing edges of said clock pulses to transfer an output pulse corresponding to an output charge from each one of said pixels; and sampling each one of said output pulses to obtain a peak value;

converting each said peak value to a digital signal functionally related to the quantity of said charge represented by said peak value; and recreating said test pattern from said digital signals representing said light-induced charges on said pixels at a rate different from said determinable rate 6. A method according to claim 5, further including the step of formatting said digital signals to a standard video format for display on standard video equipment.

* * * * *